United States Patent
Grannan et al.

(10) Patent No.: US 8,584,191 B2
(45) Date of Patent: *Nov. 12, 2013

(54) METHOD AND SYSTEM FOR UPDATING RECORDING SCHEDULES

(75) Inventors: Michael Grannan, Austin, TX (US); Brad Medford, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,535

(22) Filed: Jul. 2, 2012

(65) Prior Publication Data

US 2012/0272273 A1 Oct. 25, 2012

Related U.S. Application Data

(63) Continuation of application No. 11/593,345, filed on Nov. 6, 2006, now Pat. No. 8,296,816.

(51) Int. Cl.
*H04N 7/173* (2011.01)
(52) U.S. Cl.
USPC .......................................... 725/120; 725/133
(58) Field of Classification Search
USPC .............. 386/297; 725/39, 48, 50, 51, 86, 91, 725/120, 133
See application file for complete search history.

(56) References Cited

U.S. PATENT DOCUMENTS

| | | | |
|---|---|---|---|
| 5,576,755 A * | 11/1996 | Davis et al. ..................... 725/48 |
| 6,313,886 B1 | 11/2001 | Sugiyama | |
| 6,442,756 B1 | 8/2002 | Durden | |
| 6,525,775 B1 | 2/2003 | Kahn et al. | |
| 6,862,741 B1 | 3/2005 | Grooters | |
| 6,990,677 B1 | 1/2006 | Pietraszak | |
| 7,036,137 B1 | 4/2006 | Arsenault | |
| 7,263,202 B2 | 8/2007 | Davis et al. | |
| 7,856,650 B1 | 12/2010 | Harvey et al. | |
| 2003/0233656 A1 | 12/2003 | Sie et al. | |
| 2004/0040036 A1 | 2/2004 | An | |
| 2004/0078807 A1 | 4/2004 | Fries et al. | |
| 2004/0187151 A1 | 9/2004 | Dunstan | |
| 2005/0193425 A1 | 9/2005 | Sull | |
| 2006/0041902 A1 | 2/2006 | Zigmond | |
| 2006/0064721 A1 | 3/2006 | Del Val et al. | |
| 2006/0090181 A1 | 4/2006 | Oh | |
| 2006/0248203 A1 | 11/2006 | Yamaoka et al. | |
| 2006/0288366 A1 | 12/2006 | Boylan et al. | |
| 2007/0061842 A1* | 3/2007 | Walter et al. ..................... 725/48 |

FOREIGN PATENT DOCUMENTS

| | | |
|---|---|---|
| EP | 1363452 | 11/2003 |
| EP | 1578123 | 9/2005 |
| JP | 05054466 | 3/1993 |
| WO | WO 02/19691 | 3/2002 |
| WO | WO-2005/013612 | 10/2005 |

OTHER PUBLICATIONS

Tanenbaum, "Structured Computer Organization", 1984, 10-12.

* cited by examiner

*Primary Examiner* — David Harvey
(74) *Attorney, Agent, or Firm* — Guntin & Gust, PLC; Andrew Gust

(57) ABSTRACT

Provided are a method and a system for recording a video broadcast using a video recording device. A system can extract in-band scheduling data and generate scheduling information based on the extracted in-band scheduling data, received scheduling data, and transactional scheduling update. The system can update a recording schedule for a broadcast in response to a determined scheduling update.

20 Claims, 9 Drawing Sheets

METHOD AND SYSTEM FOR UPDATING RECORDING SCHEDULES

CROSS-REFERENCE TO RELATED APPLICATIONS

This application is a continuation of and claims priority to U.S. patent application Ser. No. 11/593,345 filed Nov. 6, 2006, which is incorporated herein by reference in its entirety.

FIELD OF THE DISCLOSURE

The present application relates generally to digital video recording of video programming or broadcasts. More particularly, example embodiments are directed to a system and method to account for scheduling changes in programming with an update of a digital video recorder (DVR) recording schedule.

BACKGROUND OF THE DISCLOSURE

Recent developments in digital technology have spurred the development and deployment of digital video broadcasting services. The digital video broadcasting services not only broadcast high quality video programming, including high-definition (HD) programs, but also provide the ability to broadcast data including electronic program guide (EPG) data. Digital broadcast programs are typically provided by satellite broadcasters, terrestrial broadcasters and cable broadcasters. More recently, digital broadcast programs have also been deployed via the Internet Protocol (IP) by major telecommunication provides.

Video broadcasters have traditionally distributed video broadcasts to viewers using a variety of broadcasting standards, including the analog National Television Standard Committee (NTSC) standard. More recently, with the constant expansion of the number of video broadcast channels, HD video broadcasts and provision of data (including EPG data), all of which have placed a premium on bandwidth for transmission, the distribution of video broadcasts has been achieved via digital standards, including the Advanced Technical Systems Committee (ATSC) standard. Other digital standards which have been used include the Moving Picture Experts Group H.262 (MPEG-2) standard, the H.264 (MPEG-4) standard and the Digital Video Broadcasting (DVB) standard. While the foregoing standards provide for in-band transmission of EPG data with the transmission of the video programming, typically EPG data has been provided out-of-band from the video programming by third-party aggregators of programming schedules, such as Tribune TV and Gemstar.

Digital video broadcasts are transmitted or distributed from the aforementioned video broadcasters to an end user's digital set top box (STB) which decodes the digital video signal for display on a video display device (e.g., television). The digital video signal may be received by the STB via a satellite dish, a coaxial cable, a telephone line (including digital subscriber line (DSL)), Ethernet, and the like. As described above, the EPG data may transmitted in-band with or out-of-band from the digital video signal being transmitted. Typically, satellite broadcasters and cable broadcasters have allocated respective carrier frequencies for receiving events or requests from the STB (including requests for EPG data) at two-way digital head ends and transmitting non-video related data (including EPG data) to the STB. As described hereinabove, such EPG data is typically obtained from the third-party aggregators of programming schedules.

Recent advancements in digital video recording technology in set top boxes have further incorporated digital video recorder (DVR) functionality into the STB for recording digital video broadcasts to a digital storage medium (e.g., hard-drive, optical storage, and the like) and playing back the recorded digital video broadcasts to the video display device. Further advancements in video recording technology have yielded the virtual DVR, where video head ends provide digital video recording functionality to the STB. The DVR functionality operates using the EPG data for scheduling the recording of particular video broadcasts.

BRIEF DESCRIPTION OF THE DRAWINGS

Some embodiments are illustrated by way of example and not limitation in the figures of the accompanying drawings in which.

DETAILED DESCRIPTION

Figure 1:
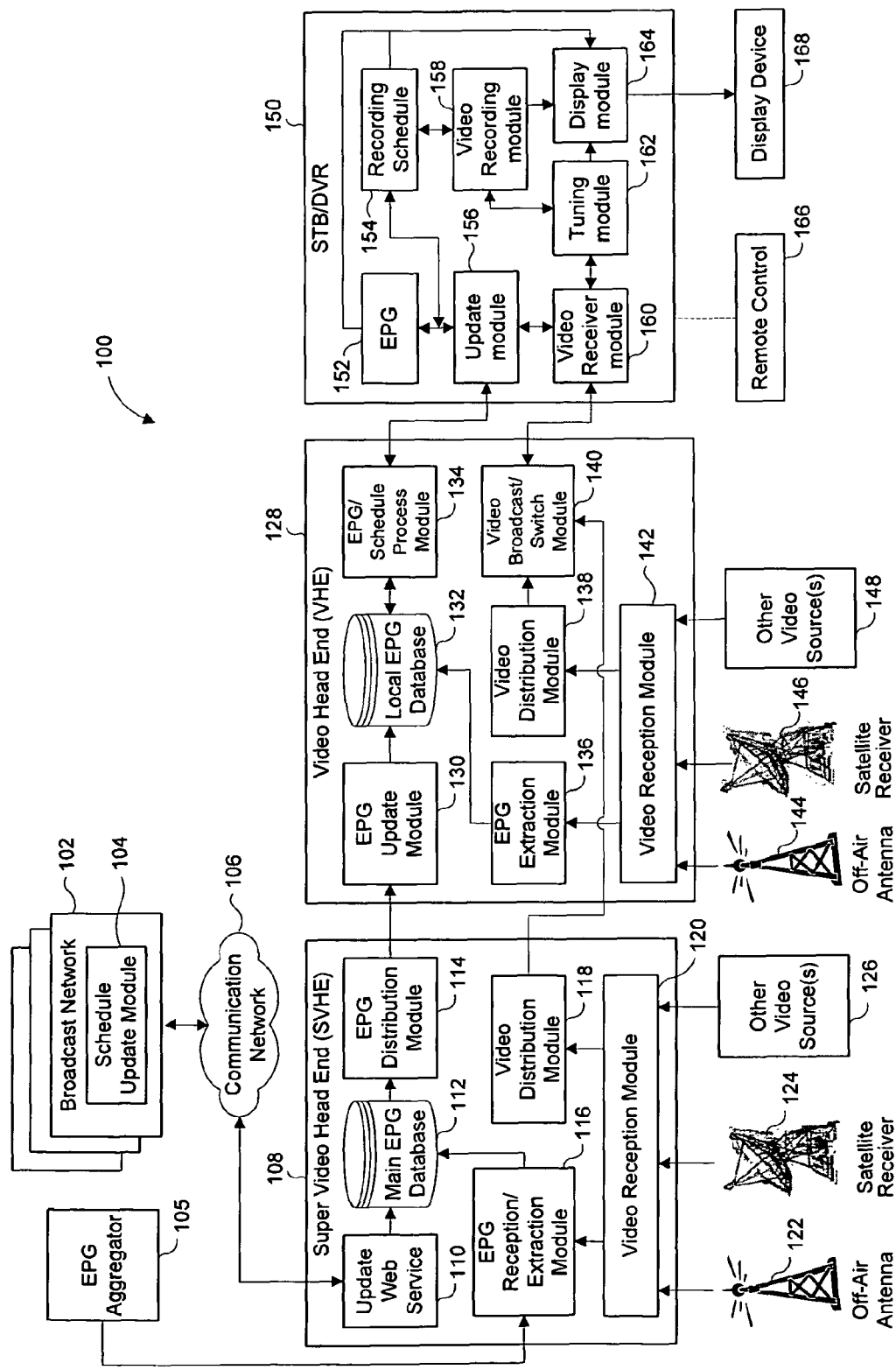
FIG. 1 is an example high-level block diagram of a video broadcasting system that accounts for scheduling changes in programming with an update of a digital video recorder (DVR) recording schedule.

An example system and method for digital video recorder (DVR) recording of video programming are described. In the following description, for the purposes of explanation, numerous specific details are set forth in order to provide a thorough understanding of example embodiments. It will be evident, however, to one skilled in the art that an example embodiment may be practiced without these specific details.

Example embodiments described herein include a system and method to account for scheduling changes in programming with updates of a DVR recording schedule.

In accordance with an embodiment, there is provided a method for recording a video broadcast using a video recording device. The method includes obtaining a scheduling update for the video broadcast over a network, updating a recording schedule for the video broadcast in response to the obtained scheduling update, and recording the video broadcast according to the updated recording schedule.

In accordance with another embodiment, there is provided a system for recording a video broadcast using a video recording device. The system includes a recording schedule to store a time schedule associated with recording the video broadcast, an update module to obtain a scheduling update for the video broadcast over a network and to update the recording schedule for the video broadcast in response to the obtained scheduling update, and a video recording module to record the video broadcast according to the updated recording schedule.

In accordance with yet another embodiment, there is provided a machine accessible medium having instructions embedded thereon, the instructions when accessed by a machine perform a method for recording a video broadcast using a video recording device. The method includes obtaining a scheduling update for the video broadcast over a network, updating a recording schedule for the video broadcast according to the received scheduling update, and recording the video broadcast according to the updated recording schedule.

In accordance with still another embodiment, there is provided a method for recording a video broadcast using a video recording device. The method includes determining a scheduling update including one or more of an updated start time and an updated stop time for the video broadcast from electronic program guide data, updating one or more of a start time and a stop time of a recording schedule for the video broadcast with respective one or more of the updated start time and the updated stop time in response to the determined scheduling update, and recording the video broadcast according to the updated recording schedule.

In accordance with a further another embodiment, there is provided a method for recording a video broadcast using a video recording device. The method includes requesting a scheduling update for the video broadcast from a video source provider, receiving the scheduling update including one or more of an updated start time and an updated stop time for the video broadcast, updating one or more of a start time and a stop time of a recording schedule for the video broadcast with respective one or more of the updated start time and the updated stop time in response to the received scheduling update, and recording the video broadcast according to the updated recording schedule.

In accordance with yet a further another embodiment, there is provided a machine accessible medium having instructions embedded thereon, the instructions when accessed by a machine perform a method for recording a video broadcast using a video recording device. The method includes determining a scheduling update including one or more of an updated start time and an updated stop time for the video broadcast from electronic program guide data, updating one or more of a start time and a stop time of a recording schedule for the video broadcast with respective one or more of the updated start time and the updated stop time in response to the determined scheduling update, and recording the video broadcast according to the updated recording schedule.

In accordance with still a further another embodiment, there is provided a machine accessible medium having instructions embedded thereon, the instructions when accessed by a machine perform a method for recording a video broadcast using a video recording device. The method includes requesting a scheduling update for the video broadcast from a video source provider, receiving the scheduling update including one or more of an updated start time and an updated stop time for the video broadcast, updating one or more of a start time and a stop time of a recording schedule for the video broadcast with respective one or more of the updated start time and the updated stop time in response to the received scheduling update, and recording the video broadcast according to the updated recording schedule.

In accordance with another embodiment, there is provided a system for recording a video broadcast using a video recording device. The system including a recording schedule to store one or more of a start time and a stop time associated with recording the video broadcast, an update module to determine a scheduling update including one or more of an updated start time and an updated stop time for the video broadcast from electronic program guide data, and further to update the one or more of the start time and the stop time of the recording schedule for the video broadcast with respective one or more of the updated start time and the updated stop time in response to the determined scheduling update, and a video recording module to record the video broadcast according to the updated recording schedule.

In accordance with a further embodiment, there is provided a system for recording a video broadcast using a video recording device. The system includes a recording schedule to store one or more of a start time and a stop time associated with recording the video broadcast, an update module to request a scheduling update including one or more of an updated start time and an updated stop time from a video source provider, and further to update the one or more of the start time and the stop time of the recording schedule for the video broadcast with respective one or more of the updated start time and the updated stop time in response to receipt of the requested scheduling update, and a video recording module to record the video broadcast according to the updated recording schedule.

FIG. 1 is an example high-level block diagram of a video broadcasting system 100 that accounts for scheduling changes in programming with scheduling updates of a digital video recorder (DVR) 150 recording schedule 154. The video broadcasting system 100 includes an electronic program guide (EPG) aggregator 105, at least one broadcast network 102, a super video head end (SHVE) 108, a video head end (VHE) 128, a set top box (STB)/digital video recorder (DVR) 150 and multiple video sources 122-16 and 144-148. The SVHE 108 is interconnected to a video head end (VHE) 128. The VHE 128 is in turn interconnected to an end user's set top box (STB)/digital video recorder (DVR) 150. It is noted that for clarity and simplicity of the depiction one SHVE 108, one VHE 128 and one STB/DVR 150 are described. However, the broadcasting system 100 may include multiple SVHEs 108; each SVHE 108 may be interconnected to multiple VHEs 128; and each VHE 128 may be interconnected to multiple STB/DVR units 150. The interconnection between the SVHE 108 and the VHE 128 may be accomplished via a long haul transport network (e.g., gigabit Ethernet network, Asynchronous Transfer Mode (ATM) network, frame relay network) and the like. The interconnection between the VHE 128 and the STB/DVR 150 may be accomplished via a fiber to the home (FTTH), fiber to the node (FTTN), telephone (including digital subscriber line (DSL)), coaxial cable, hybrid fiber/coaxial, and combinations thereof. Alternate connections may also be employed to interconnect the SVHE 108 to the VHE 128 and the VHE 128 to the STB/DVR 150.

Now with particular reference to the SHVE 108 of FIG. 1, the SVHE 108 includes a video reception module 120 that receives video programming of video broadcasts from multiple video sources, including off-air antenna 122, satellite receiver 124, as well as any other video sources 126, which may include fiber feed sources, video servers and tape machines, which serve video programming The video programming received by the video reception module 120 may be in a variety of formats, including NTSC, ATSC, MPEG-2, MPEG-4, DVB, Windows Media, baseband digital, and other available formats. The SVHE 108 further includes a video distribution module 118 that cooperates with the video reception module 120 to distribute the video programming received by the video reception module 120 to a video broadcast/switch module 140 of a video head end (VHE) 128 (described in further detail herein below). More specifically, the video reception module 120 may decode (via video decoders) the video programming received in the aforementioned different formats into a standardized format. In turn, the video distribution module 118 may further encode (via video encoder) the video programming provided in the standardized format by the video reception module 120 into a digital format for ultimate distribution to the STB 150 (e.g., MPEG-2, MPEG-4 and the like). The video distribution module 118 may further multiplex (e.g., via statistical multiplexing) video broadcasts of multiple digital video broadcast channels over one carrier frequency allocation (e.g., 6 MHz or 8 MHz), which is a typical carrier frequency allocation that may be used for one analog channel.

Further with reference to FIG. 1, the SVHE 108 also includes an electronic program guide (EPG) reception/extraction module 116, which may receive EPG data from and EPG aggregator 105 and may further extract EPG data from video sources 122-126. More specifically, the EPG reception/extraction module 116 may receive out-of-band EPG data from the EPG aggregator 105, which aggregates and maintains EPG data from multiple broadcast networks (e.g., broadcast network 102). The EPG data identifies video broadcasts in accordance with the ATSC standard A/65 (commonly referred to an event information table (EIT)), designating their respective time slots and broadcast channels (e.g., carrier frequencies coupled with transport stream identifier (TSID)). The EPG reception/extraction module 116 may further extract in-band EPG data from the video programming decoded by the video reception module 120, which is received from the respective video sources 122, 124 and 126. The video sources 122-26 may or may not provide in-band EPG data. Upon receipt or extraction of EPG data, the EPG reception/extraction module 116 may periodically (e.g., every day) update a main EPG database 112 with the received/extracted EPG data for a predetermined time period (e.g., a two week period). The periodic update of the main EPG database 112 may be on a scheduled basis (e.g., nightly) or may be on a real-time basis. Upon the periodic update, the EPG reception/extraction module 116 notifies the EPG distribution module 114 that a periodic update had been performed. Upon notification, the EPG distribution module 114 distributes the EPG data in the main EPG database 112 to the VHE 128 as will be described in greater detail below.

Still further with reference to FIG. 1, the at least one broadcast network 102 is interconnected over a communication network 106 to the update web service 110 of the SVHE 108 and is enabled to provide out-of-band scheduling updates to the SVHE 108 for digital video programming received via video sources 122-126. The communication network 106 may be any conventional network, including the Internet, Wide Area Network (WAN), Metropolitan Area Network (MAN), Campus Area Network (CAN), wireless, satellite, as well as a variety of different combinations thereof. The communication over the communication network 106 between the schedule update module 104 of the broadcast network 102 and the update web service 110 of the SVHE 108 may be accomplished via a variety of different protocols, including transfer control protocol/Internet protocol (TCP/IP), hyper text transfer protocol (HTTP), extensible markup language (XML), as well as other well known protocols and communication methods.

Yet further with reference to FIG. 1, the web service 110 of SVHE 108 may receive via the communication network 106 out-of-band scheduling updates from a schedule update module 104 of the at least one broadcast network 102. The at least one broadcast network 102 may include the American Broadcasting Channel (ABC), National Broadcasting Channel (NBC), Central Broadcasting Station (CBS), Entertainment and Sports Programming Network (ESPN), and the like. The communication between the schedule update module 104 of the at least one broadcast network 102 and the update web service 110 of the SVHE 108 may be a framework that supports automated scheduling updates. The update web service may further provide a secure framework, in which the update web service 110 authenticates the at least one broadcast network 102 before authorizing transmission of scheduling updates. It should be noted that the update web service 110 is not a primary means of receiving EPG data, rather it is used to convey last minute scheduling changes to mitigate any delay in receiving such data given the periodic nature of the updates from the EPG aggregator 105 or video sources 122-126. Each of the at least one broadcast network 102 may occasionally update via its schedule update module 104 the scheduling of certain video broadcasts. More specifically, the scheduling updates may be employed when regularly scheduled video broadcasts are pre-empted by other video broadcasts (e.g., State of the Union Address, emergency broadcast and the like) or a time slot of a regularly scheduled video broadcast is changed to another scheduled time slot. The scheduling updates may also be employed when a start time or a stop time of a regularly scheduled video broadcast is changed. This may occur when a regularly scheduled video broadcast is extended (e.g., sports event that lasts longer that the time allotted), causing its stop time to be extended. It is to be noted that the extension of one regularly scheduled video broadcast may necessarily impact one or more of the start time and the stop time of a later regularly scheduled video broadcast.

Still further with reference to FIG. 1, when a broadcast network 102 updates a regularly scheduled video program, the scheduling update is transmitted from the schedule update module 104 of the broadcast network 102 via the communication network 106 to the update web service 110. The update web service 110 receives the scheduling update and updates the EPG data in the main EPG database 112 with the scheduling update. The update web service 110 further notifies the EPG distribution module 114 of the scheduling update. At a predetermined time, the EPG distribution module 114 reads the main EPG database to obtain scheduling updates and distributes the scheduling updates to the EPG update module 130 of the VHE 128. The predetermined time may be a preset time interval (e.g., every minute) or may be determined based on the number of scheduling updates (e.g., every update), or any other variation or setting. More specifically, the EPG distribution module 114 of the SVHE 108 may communicate with the EPG update module 130 of the VHE 128 at predetermined times in two distinct modes: transmitting a bulk update including an entire EPG (multiple video broadcasts) from the main EPG database 112 for a certain date/time duration, or transmitting transactional scheduling updates for specific video broadcasts.

Now with particular reference to the VHE 108, the VHE 108 includes a video reception module 142 that receives local video programming or broadcasts from multiple video sources, including off-air antenna 144, satellite receiver 146 and other video sources 148. The local video programming received by the video reception module 142 may be in a variety of formats, including NTSC, ATSC, MPEG-2, MPEG-4, DVB, Windows Media, baseband digital, and other available formats. The other video sources 148 may include fiber feed sources, video servers and tape machines, which serve video programming. In addition, the other video sources 148 may also include video programming received via telecom transport networks directly from a broadcaster in any of the foregoing formats. The VHE 128 further includes a video distribution module 138 that cooperates with the video reception module 142 to distribute the local video programming received by the video reception module 142 to an end-user's STB/DVRs 150. Similarly to the video reception module 120 of the SVHE 108, the video reception module 142 of the VHE 128 may decode (via video decoders) the local video programming received in the aforementioned different formats into a standardized format. In turn, the video distribution module 138 may further encode (via video encoder) the video programming provided in the standardized format by the video reception module 142 into a digital format for ultimate distribution to the STB/DVR 150 (e.g., MPEG-2, MPEG-4 and the like). The video distribution module 138 may further multiplex (e.g., via statistical multiplexing) video broadcasts of multiple digital video broadcast channels over one carrier frequency allocation (e.g., 6 MHz or 8 MHz). Furthermore, the video programming from the video distribution module 118 of the SVHE 108 and the local video programming from the video distribution module 138 of the VHE 128 are distributed to the video broadcast/switch module 140, which broadcasts or switches channels of the video programming from the SVHE 108 and the VHE 128 to a video receiver module 160 of the end-user's STB/DVR 150 (described hereinafter in greater detail).

Further with reference to the VHE 128 of FIG. 1, the VHE 128 includes an EPG update module 130 that receives both periodic updates and scheduling updates from the EPG distribution module 114 of the SVHE 108. Upon receipt of an update (e.g., periodic or scheduling), the EPG update module 130 updates the local EPG database 132 and notifies the EPG/schedule process module 134. Upon notification, EPG schedule process module 134 may distribute the update (e.g., periodic or scheduling) to an update module 156 of an end user's STB/DVR 150 automatically. Alternatively, the EPG schedule process module 134 may distribute only the periodic updates automatically and may await a request to distribute a scheduling update to the update module 156 of the STB/DVR 150. Typically, the periodic or scheduling updates may be distributed at predetermined time or times (e.g., such as early morning), or when the update is requested by the STB/DVR 150.

Still further with reference to the VHE 128, the VHE 128 also includes an electronic program guide (EPG) extraction module 136, which extracts EPG data from the local video programming received by the video reception module 142 from the respective video sources 144, 146 and 148 based on a change notification signal in the video programming. It is noted the bulk of the EPG data is received via the EPG update module 130 from the EPG distribution module 114 and inserted into the local EPG database 132, as the updates (e.g., periodic or scheduling) are received by the VHE 128. The EPG data extracted from the local video programming identifies video broadcasts for a predetermined period of time (e.g., typically two weeks to one month), their respective time slots, channel designations program descriptions and other video program related information. The EPG extraction module 136, upon receipt of the change notification signal, periodically updates the local EPG database 132 with the extracted EPG data. Upon the periodic update, the EPG extraction module notifies the EPG distribution module 134 that a periodic update had been performed. Upon notification, the EPG distribution module 114 distributes the periodic update to the STB/DVR 150. Such distribution may be initiated by the VHE 128 at midnight, at which point an extra day of programming two weeks out is added to the EPG data, or initiated by the STB/DVR 150 when a user navigates to a date/time that is not locally stored in the EPG 152 of the STB/DVR 150, thus requiring a download of EPG data for required time).

Now with particular reference to the STB/DVR 150, the STB/DVR 150 includes a video receiver module 160, a tuning module 162 and a display module 164. The video receiver module 160 receives video programming from the video broadcast/switch module 140 of the VHE 128. Upon channel selection by a user via a remote control 166, the tuning module 162 may select a particular channel from the video programming received by the video receiver 160 (if multiple channels including the channel selected are being received) for display by the display module 164 on the display device 168. Alternatively, upon channel selection by the user via the remote control 166, the tuning module 162 may request the video receiver 160 to request the video broadcast/switch module 140 to switch the video programming to the requested channel (if a non-requested channel is being received) for display by the display module 164 on the display device 168.

Still further, the STB/DVR 150 further includes an en electronic program guide 152, a recording schedule 154 and an update module 156. The update module 156 may glean from in-band EPG data associated with video programming being received at STB/DVR 150 via video receiver module 160 whether there is a scheduling update, and if so, may further update the EPG 152 and recording schedule 154 in accordance with the update. The update module may further receive periodic or scheduling updates from the VHE 128. Upon receipt of a periodic update or a scheduling update, the update module 156 updates the EPG 152 and recording schedule 154 in accordance with the update. For both of the above scenarios, the update module 156 may or may not update the EPG 152 based on particular requirements. For a periodic update (e.g., every day), the update module 156 overwrites the EPG 152 with the periodic update and updates entries in the recording schedule 154 with those included in the periodic update. For a scheduling update, the update module 156 updates entries in the EPG 152 and recording schedule 154 that correspond to the scheduling update. As mentioned hereinabove, a particular video broadcast may be pre-empted or its start time and/or stop time changed, etcetera. Upon pre-emption of a video broadcast, the video broadcast's corresponding entries in the EPG 152 and recording schedule 154 may be updated via a scheduling update. In the EPG 152, the description for the entry may be updated to reflect that the regularly scheduled video broadcast has been pre-empted. In the recording schedule 154, the description for the entry may be updated to reflect that the regularly scheduled video broadcast has been pre-empted and the start time and the stop time may be reset to "null" values (or recording schedule for that video program may otherwise be disabled). Upon the change of the start time and/or stop time of a video broadcast, the video broadcast's corresponding time entries in the EPG 152 and recording schedule 154 are updated to reflect the change of time.

Further with reference to FIG. 1, the STB/DVR 150 also includes a video recording module 158 that may record a scheduled video broadcast and play the recorded video broadcast via the display module 164 on the display device 168. The video recording module 158 may poll the recording schedule 154 at predetermined time intervals or via other mechanisms may query the recording schedule 154 to determine whether there is a scheduled recording. Alternatively, notifications to the video recording module 158 to start and/or stop recording may be transmitted via system interrupts on the basis of the recording schedule 154. In an embodiment in which scheduling changes are automatically distributed from the EPG/schedule process module 134 of the VHE 128 to the update module 156, and upon a determination that there is a scheduled recording, the video recording module 158 may start recording at the start time for the particular video broadcast to be recorded and may stop recording at the stop time. It is noted that if the start time and the stop time are "null" values (or if the video program is otherwise disabled for recording), indicates to the video recording module 158 that no recording is to occur.

Still further with reference to FIG. 1, in another embodiment in which scheduling changes are not automatically distributed from the EPG/schedule process module 134 of the VHE 128 to the update module 156 (or not done so in a timely manner to impact a pending video recording), the video recording module 158 may request the update module 156 to obtain one or more scheduling updates for each scheduled recording. More specifically, the first one or more requests may be made at predetermined times before the start time of the scheduled recording (e.g., two hours and/or two minutes before the start time of the scheduled recording) in the event that the scheduled video broadcast may be broadcast earlier than the scheduled start time or pre-empted/rescheduled, respectively. For each of the first one or more requests, the update module 156 may transmit a scheduling update request for the scheduled broadcast to the EPG/schedule process module 134, which in turn may query or interrogate the local EPG database 132 to determine whether the start and/or stop times for the requested video broadcast have changed, and may further return a result to the update module 156. The result may be a scheduling update that includes a flag, which designates whether the start/stop times for a video broadcast are updated, and additional data that may denote the video broadcast name, start time and stop time. A flag that is set to off (e.g., zero) may represent to the update module 156 of the STB/DVR 150 that there has been no scheduling update for the video broadcast. Alternatively, a flag that is set to on (e.g., one) may represent to the update module 156 of the STB/DVR 150 that there has been a scheduling update for the video broadcast. Upon receipt of a result with no scheduling update, the update module 156 may notify the video recording module 158 that no scheduling update is available, in which case the video recording module 158 may record the scheduled video broadcast as indicated in the recording schedule 154. Upon receipt of a scheduling update, the update module 156 may update the respective entries in the EPG 152 and in the recording schedule 154 in accordance with the scheduling update and may notify the video recording module 158 that a scheduling update has occurred. Upon notification of a scheduling update, the video recording module 158 polls the recording schedule 154 to determine whether the video broadcast for which scheduling was updated is to start at a start time that is different than the regularly scheduled start time. If so, the video recording module may start recording the updated scheduled video broadcast at the start time indicated (as updated).

Additionally with reference to FIG. 1, once the video recording module 158 has started recording a video broadcast at the indicated start time, the video recording module 158 may make a second request to the update module 156 at a predetermined time before the stop time of the scheduled recording (e.g., two minutes before the stop time of the scheduled recording) in the event that the scheduled video broadcast may have been extended. The update module 156 may transmit a scheduling update request for the scheduled broadcast to the EPG/schedule process module 134, which in turn queries the local EPG database 132 for the scheduled broadcast and returns a result to the update module 156. The result may likewise be a scheduling update, which will similarly include a flag indicating whether the stop time has changed for the scheduled broadcast, and if so, will include an updated stop time. Upon receipt of a result with no scheduling update, the update module 156 may notify the video recording module 158 that no scheduling update is available, in which case the video recording module 158 may record the scheduled video broadcast as indicated in the recording schedule 154 (e.g., stopping recording at an indicated scheduled stop time). Upon receipt of the scheduling update, the update module 156 may update the respective entries in the EPG 152 and/or in the recording schedule 154 in accordance with the scheduling update and may notify the video recording module 158 that a scheduling update has occurred. Upon notification, the video recording module 158 polls the recording schedule 154 to determine whether the video broadcast which is being recorded and for which scheduling was updated is to stop at a later stop time. If so, the video recording module may stop recording the updated scheduled video broadcast at the stop time indicated (e.g., stopping recording at a later stop time).

Figure 2:
FIG. 2 is an example electronic program guide that may be displayed on a display device, in accordance with FIG. 1.

FIG. 2 is an example electronic program guide 200 that may be displayed by STB/DVR 150 on the display device 168, in accordance with FIG. 1. Upon selection by a user via the remote control 166, the display module 162 may display a portion of the example electronic program guide 200 from EPG 152 to the user on the display device 168 for a current date 202. The displayed portion may include video broadcasts for a predetermined number of channels 206 (e.g., channel 16 through channel 26) and for a block of time 204 (e.g., from 2:00 PM to 3:330 PM). The number of channels 206 and the block of time 204 may be adjusted based on particular requirements. A video broadcast may be highlighted 208 by the user using, for example, the remote control 166, and a description 210 therefor is displayed on the display device 168. The user may scroll through the video broadcasts in the EPG 152 using the remote control 166 and may select to display a description of any video broadcast and may further select to record any video broadcast.

Figure 3:
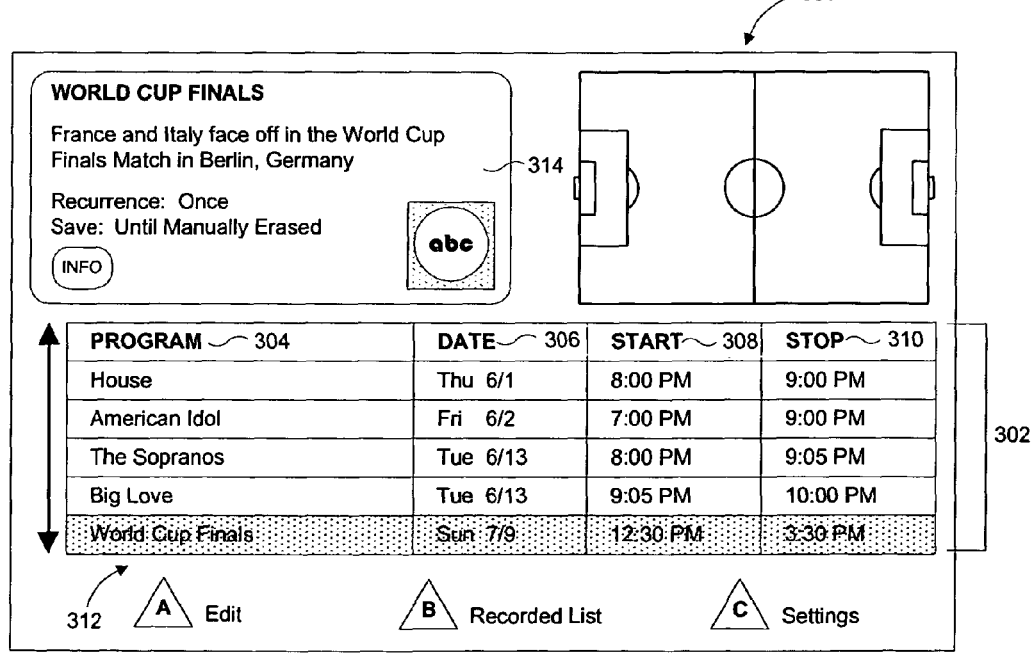
FIG. 3 is an example recording schedule before an update displayed on a display device, in accordance with FIG. 1.

FIG. 3 is an example recording schedule 300 before a scheduling update that may be displayed on a display device 168, in accordance with FIG. 1. Upon selection by a user via the remote control 166, the display module 164 may display the example recording schedule 300 from recording schedule 154 to the user on the display device 168. The example recording schedule 300 may include one or more entries or video broadcasts 302 to be recorded. Each of the video broadcasts 302 to be recorded includes a program description 304, a date of recording 306, a start time 308 and a stop time 310 of recording. At reference numeral 312, there is depicted an example video broadcast which is to be recorded. The start time 308 and the stop time 310 of video broadcast 312 are indicated to be 12:30 PM and 3:30 PM, respectively. Assuming that there are no periodic updates or scheduling updates for the duration of the video broadcast 312 (e.g., from 12:30 PM to 3:300 PM) in accordance with the update methods described hereinabove in reference to FIG. 1, the video recording module 158 may record the video broadcast 312 from the scheduled start time 308 (e.g., 12:30 PM) to the scheduled stop time 310 (e.g., 3:30 PM).

Figure 4A:
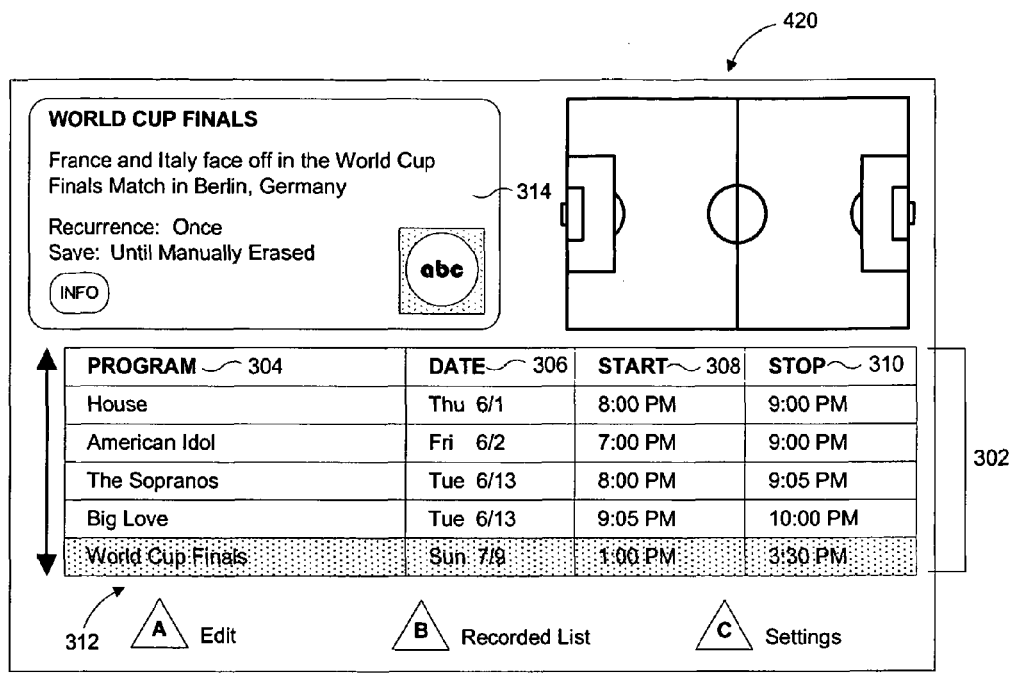
FIG. 4A-4B are example recording schedules after an update displayed on a display device, in accordance with FIG. 1.

FIG. 4A is an example recording schedule 420 after a scheduling update, which may be displayed on a display device 168 in accordance with FIG. 1. Upon selection by a user via the remote control 166, the display module 164 may display the example recording schedule 420 from recording schedule 154 to the user on the display device 168. As shown in the example recording schedule 420, the start time 308 of video broadcast 312 has been updated from 12:30 PM to 1:00 PM. As described hereinabove with reference to FIG. 1, the scheduling update may have been necessitated by an extension of a preceding video broadcast, by a pre-emption of the preceding video program that may have impacted the start time 308 of video broadcast 312, or by the insertion of another video broadcast from 12:30 PM to 1:00 PM (e.g., a video broadcast directed to a preview of the "World Cup Finals" video broadcast). In any case, as depicted in the recording schedule 420, a relevant update was applied to the recording schedule 154 of the STB/DVR 150 before the original start time 308 (e.g., 12:30 PM) of the scheduled video broadcast 312 based on the recording schedule updates described hereinbefore with reference to FIG. 1. Furthermore, the video recording module 158 was notified of the scheduling update and may therefore record the scheduled video broadcast 312 as updated by the scheduling update (e.g., from 1:00 PM to 3:30 PM).

Figure 4B:
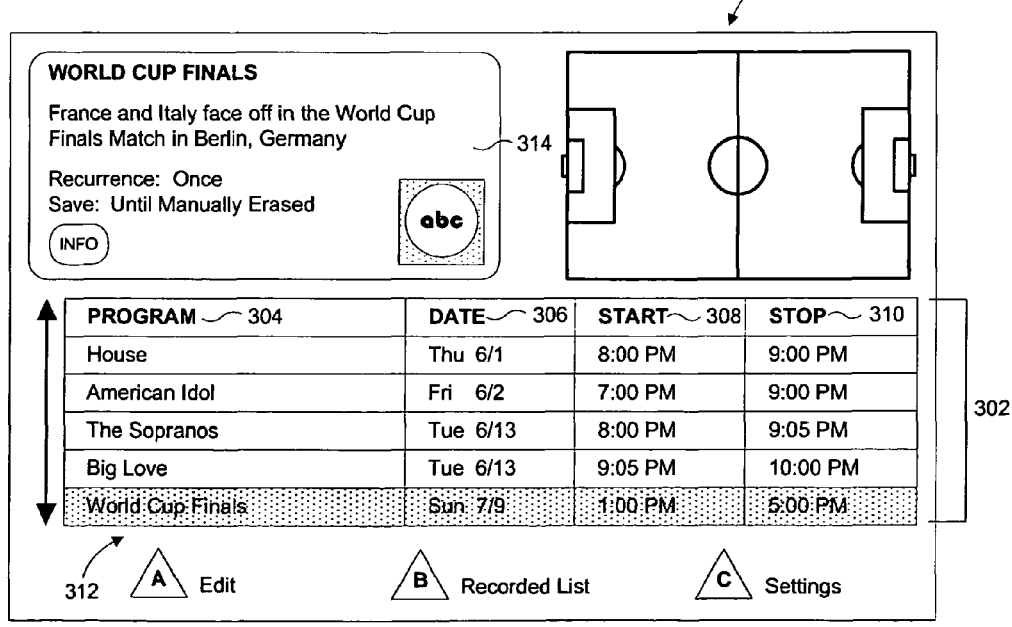

FIG. 4B is another example recording schedule 440 after a scheduling update, which may be displayed on a display device 168 in accordance with FIG. 1. Upon selection by a user via the remote control 166, the display module 164 may display the example recording schedule 440 from recording schedule 154 to the user on the display device 168. As shown in the example recording schedule 440, the end time 310 of video broadcast 312 has been updated from 3:30 PM to 5:00 PM. As described hereinabove with reference to FIG. 1, the scheduling update may have been necessitated by an extension of the video broadcast 312 (e.g., overtime extension). In any case, as depicted in the recording schedule 440, a relevant scheduling update was applied to the recording schedule 154 of the STB/DVR 150 before the original end time 308 of the scheduled video broadcast 312 (depicted in FIG. 4B) based on the recording schedule updates described hereinbefore with reference to FIG. 1. As a result, the video recording module 158 may continue to record the scheduled video broadcast 312 as updated by the scheduling update (e.g., from 1:00 PM to 5:00 PM).

Figure 5:
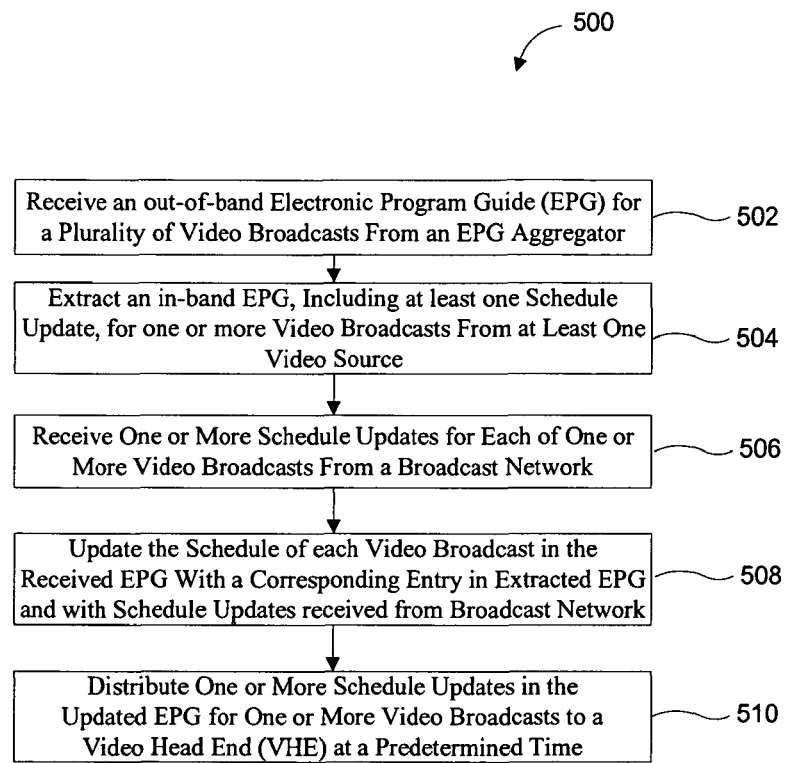
FIG. 5 is a flowchart that illustrates an example method for the Super Vide Head End (SVHE) to obtain and distribute schedule updates to the Video Head End (VHE) in accordance with FIG. 1.

FIG. 5 is a flowchart that illustrates an example method 500 for the SVHE 108 to obtain and distribute schedule updates to the VHE 128 in accordance with FIG. 1. The method begins at operation 502 in which the SVHE 108 receives an out-of-band electronic program guide (EPG) data for plural video broadcasts from an EPG aggregator 105. More specifically, the EPG reception/extraction module 116 receives the EPG data and updates the main EPG database 112 with the EPG data. At operation 504, the SVHE 108 via the EPG reception/extraction module 116 extracts in-band EPG, which may include at least one schedule update, for one or more video broadcasts, from the at least one video source 122-126. At operation 506, the SVHE 108 may receive one or more schedule updates for each of one or more video broadcasts from at least one broadcast network 102. More specifically, the SVHE 108 may receive the schedule updates via update service 110 from schedule update module 104 of the broadcast network 104 using communication network 106. At operation 508, the EPG data in the main EPG database 112 is updated with a corresponding entry in the extracted EPG and with schedule updates received from the at least one broadcast network 102. More specifically, the main EPG database 112 may be updated by the EPG reception/extraction module 116 and the update web service 110. Lastly, at operation 508, the updated schedules of video broadcasts in the EPG database 112 are distributed to the VHE 128 at a predetermined a time via the EPG distribution module 114.

Figure 6:
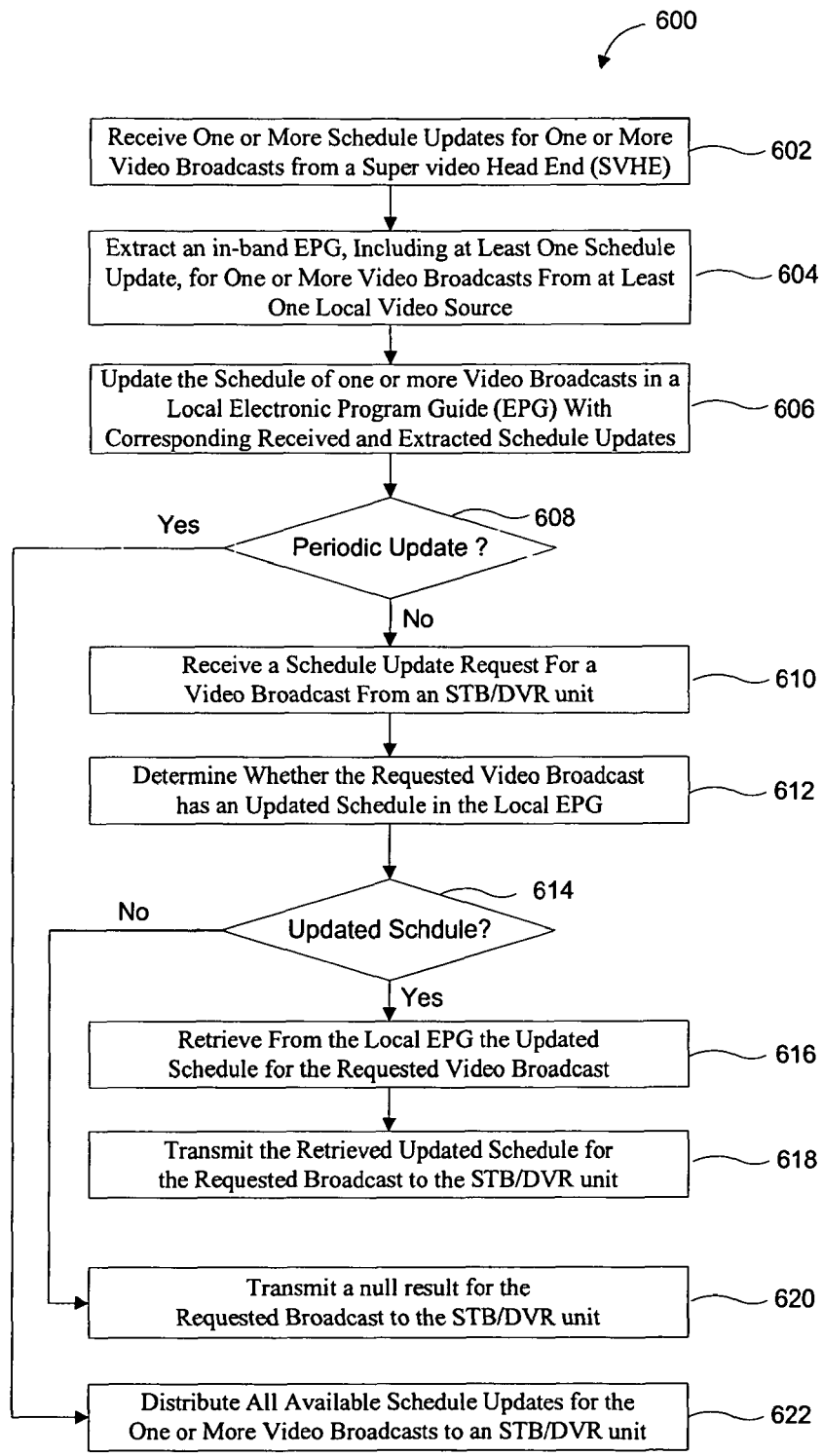
FIG. 6 is a flowchart that illustrates an example method for the VHE to receive and distribute schedule updates to the Set Top Box/Digital Video Recorder (STB/DVR) in accordance with FIG. 1.

FIG. 6 is a flowchart that illustrates an example method 600 for the VHE 128 to receive and distribute schedule updates to the STB/DVR 150 in accordance with FIG. 1. More specifically, the method 600 begins at operation 602 in which the VHE 128 receives one or more schedule updates for one or more video broadcasts from the SVHE 108 via the EPG update module 130. The schedule updates are used to update schedules of corresponding video broadcasts in the local EPG database 132. At operation 604, the VHE 108 via EPG extraction module 136 extracts in-band EPG, which may include at least one schedule update, for one or more video broadcasts, from at least one video source 144-148. At operation 606, the schedules of the one or more video broadcasts are updated in the local EPG database 132 with the received and extracted schedule updates via respective modules 130 and 136. At operation 608, it is determined whether a periodic update is to be performed at a predetermined time. If a periodic update is to be performed, the method 600 continues at operation 622 in which the EPG/schedule process module 134 distributes all available schedule updates for video broadcasts in the local EPG database 132 to the STB/DVR 150. If however there no periodic update to be performed, the method 600 continues at operation 610 in which the VHE 128 via the EPG/schedule process module 134 receives a schedule update request for a video broadcast from a STB/DVR 150. At operation 612, the EPG/schedule process module 134 queries or interrogates the local EPG database 132 as to whether a video broadcast has an updated schedule. If at operation 614 it is determined that the video broadcast does not have an updated schedule the method continues at operation 620 in which a null result for the schedule of requested video broadcast is transmitted to the STB/DVR 150. Alternatively, if at operation 614 the video broadcast has an updated schedule, the method 600 continues at operation 616 in which the EPG/schedule process module 134 retrieves the updated schedule for the video broadcast from the local EPG data base 132 and at operation 618 transmits the retrieved updated schedule to the STB/DVR 150.

Figure 7:
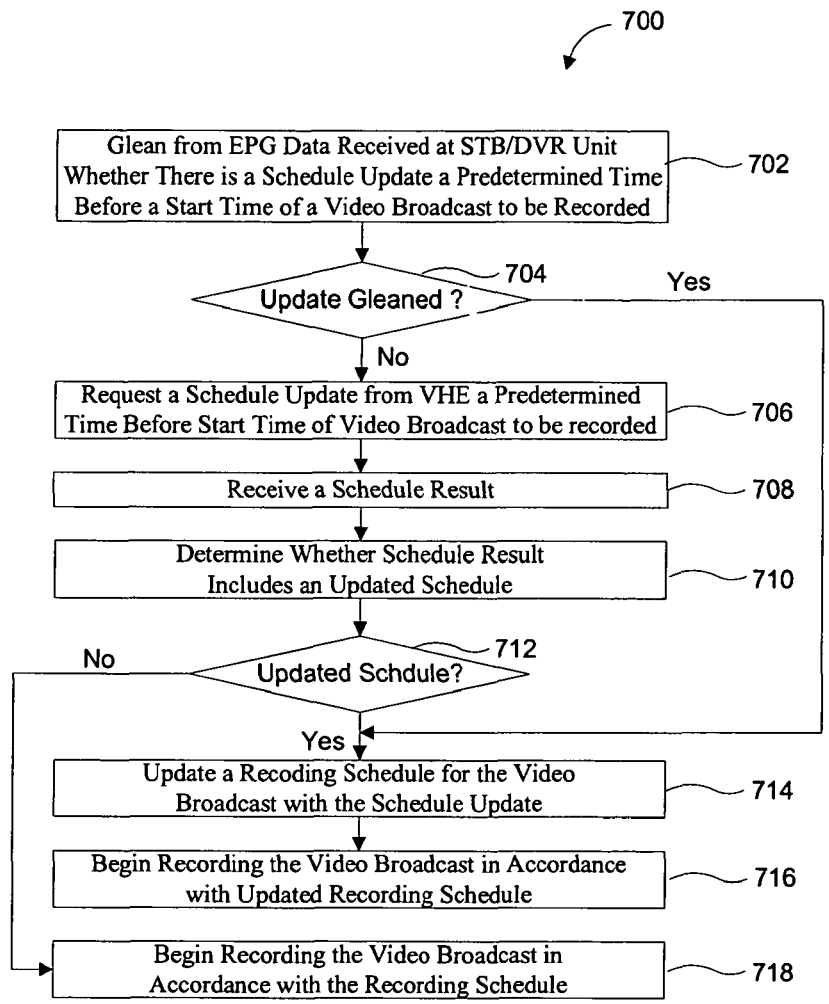
FIG. 7 is a flowchart that illustrates an example method for the STB/DVR to begin recording of a video broadcast based on a schedule update in accordance with FIG. 1.

FIG. 7 is a flowchart that illustrates an example method 700 for the STB/DVR 150 to begin recording of a video broadcast based on a schedule update in accordance with FIG. 1. The method 700 begins at operation 702 in which the update module 156 may glean from EPG data received at STB/DVR 150 via video receiver module 160 whether there is a schedule update a predetermined time before a start time of a video broadcast to be recorded by the video recording module 158. The gleaning for the schedule update may be based upon a request for an updated schedule by the video recording module 158 of the STB/DVR 158 in accordance with FIG. 1. At operation 704, it is determined whether an updated schedule for the video broadcast was gleaned from the EPG data received at the STB/DVR 150. If no updated schedule were gleaned, the method 700 continues at operation 706 in which the STB/DVR 150 via update module 158 may request a schedule update from the VHE 128 a predetermined time before a start time of the video broadcast to be recorded. At operation 708, the update module 156 of the STB/DVR 150 receives a schedule result from EPG/schedule process module 134 of the VHE 128. At operation 710 it is determined whether the schedule result includes an updated schedule (e.g., start time and/and end time) for the video broadcast to be recorded. If there is no updated schedule, the method 700 continues at operation 718 in which the video recording module 158 of the STB/DVR 150 begins recording the video broadcast in accordance with the recording schedule 154 (e.g., start time) for the video broadcast. If however it is determined at operation 712 that there is an updated schedule for the video broadcast, the method 700 continues at operation 714 in which the updated module 156 of the STB/DVR updates the recording schedule 154 for the video broadcast. At operation 716, the video recording module 158 of the STB/DVR 150 begins recording the video broadcast in accordance with the updated recording schedule 154 (e.g., start time) for the video broadcast.

Figure 8:
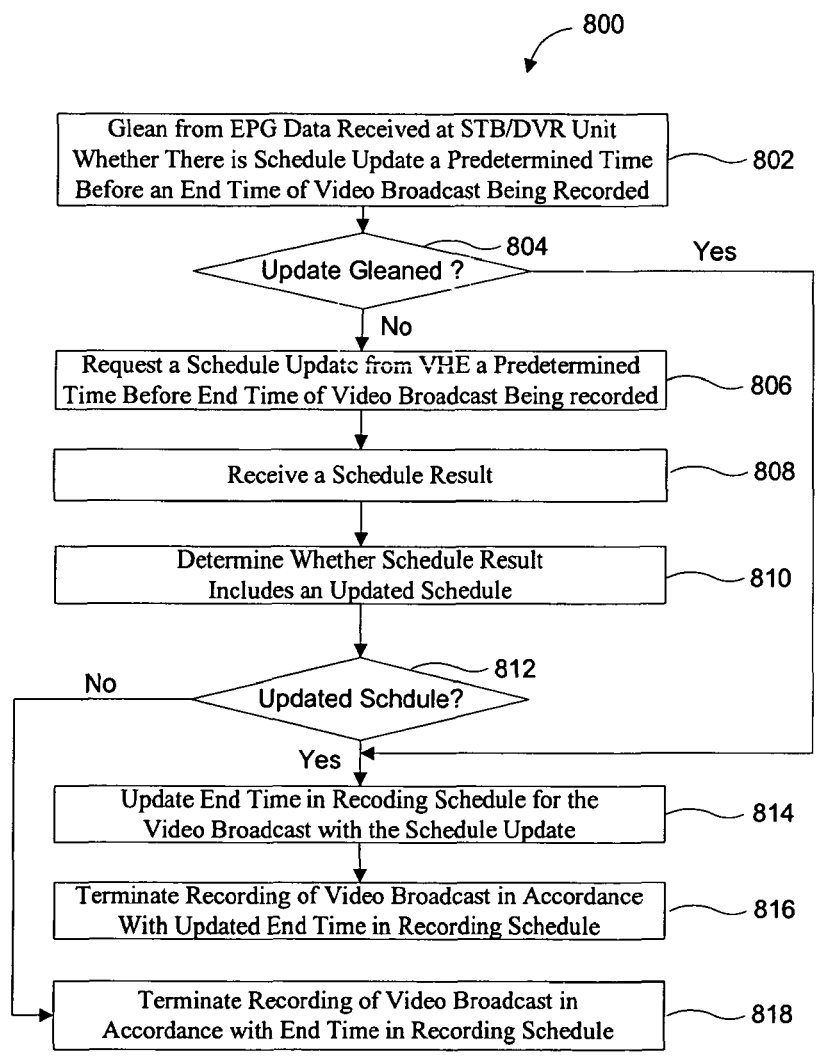
FIG. 8 is a flowchart that illustrates an example method for the STB/DVR to stop recording of a video broadcast based on a schedule update in accordance with FIG. 1.

FIG. 8 is a flowchart that illustrates an example method 800 for the STB/DVR 150 to stop recording of a video broadcast based on a schedule update in accordance with FIG. 1. The method 800 begins at operation 702 in which the update module 156 may glean from EPG data received at STB/DVR 150 via video receiver module 160 whether there is a schedule update a predetermined time before an end time of a video broadcast being recorded being recorded by the video recording module 158. The gleaning for the schedule update may be based upon a request for an updated schedule by the video recording module 158 of the STB/DVR 158 in accordance with FIG. 1. At operation 804, it is determined whether an updated schedule for the video broadcast was gleaned from the EPG data received at the STB/DVR 150. If no updated schedule were gleaned, the method 800 continues at operation 806 in which the STB/DVR 150 via update module 158 may request a schedule update from the VHE 128 a predetermined time before an end time of the video broadcast being recorded by the video recording module 158. At operation 808, the update module 156 of the STB/DVR 150 receives a schedule result from EPG/schedule process module 134 of the VHE 128. At operation 810 it is determined whether the schedule result includes an updated schedule (e.g., end time) for the video broadcast being recorded. If there is no updated schedule, the method 800 continues at operation 818 in which the video recording module 158 of the STB/DVR 150 end recording the video broadcast in accordance with the recording schedule 154 (e.g., end time) for the video broadcast. If however it is determined at operation 812 that there is an updated schedule for the video broadcast (e.g., end time), the method 800 continues at operation 814 in which the updated module 156 of the STB/DVR updates the recording schedule 154 for the video broadcast. At operation 816, the video recording module 158 of the STB/DVR 150 terminates recording the video broadcast in accordance with the updated recording schedule 154 (e.g., end time) for the video broadcast.

Figure 9:
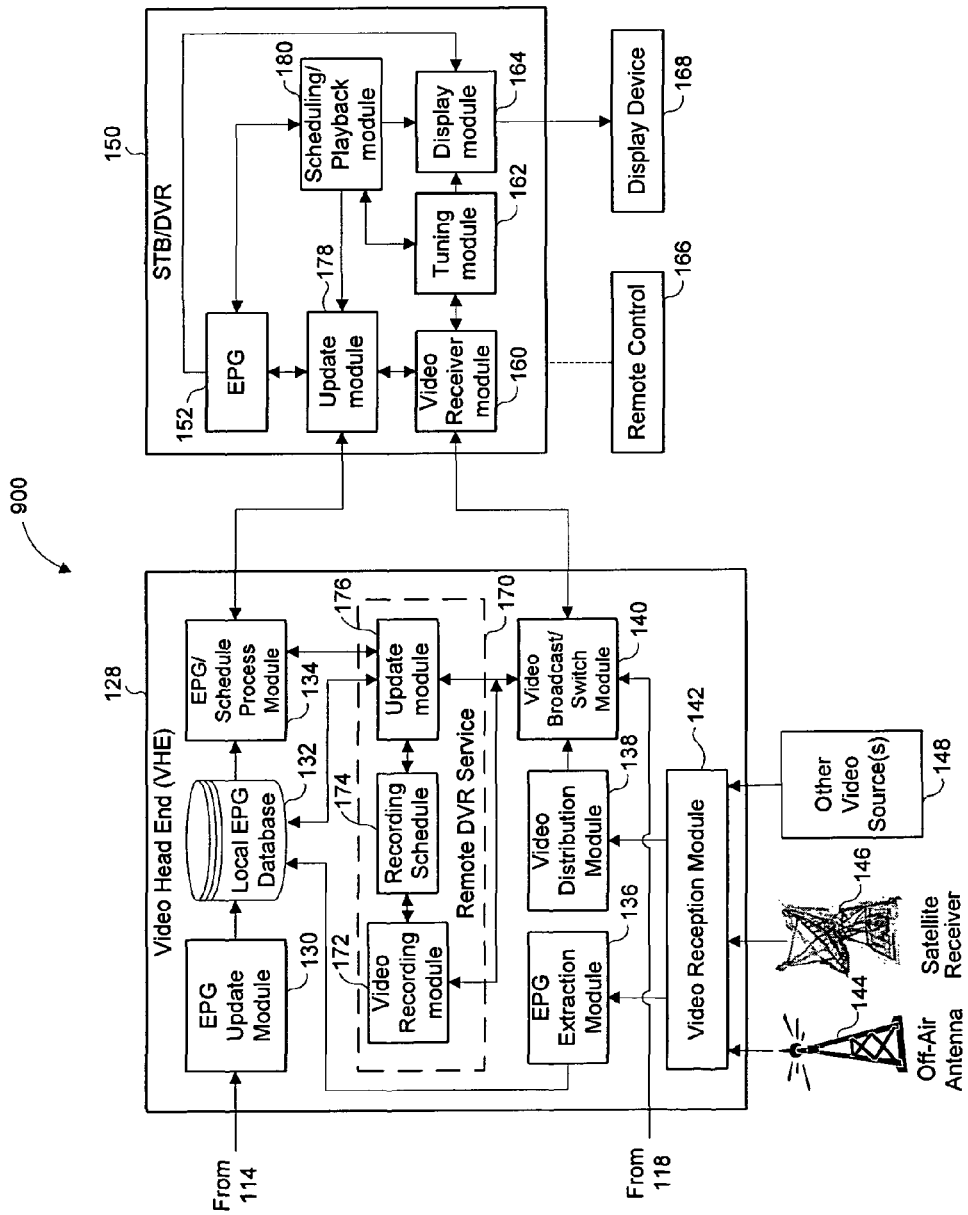
FIG. 9 is an example high-level block diagram of a video broadcasting system that accounts for scheduling changes in programming with scheduling updates of a remote digital video recorder (DVR) service recording schedule.

FIG. 9 is an example high-level block diagram of a video broadcasting system 900 that accounts for scheduling changes in programming with scheduling updates of a remote digital video recorder (DVR) service 170 recording schedule 174. Video broadcasting system 900 of FIG. 9 is similar to video broadcasting system 100 of FIG. 1, except that video recording and scheduling updates are performed at the video head end 128. More specifically, the VHE 128 includes a remote DVR service 170. The remote DVR service 170 includes a video recording module 172, a recording schedule 174 and an update module 176. The video recording module 172 may record a scheduled video broadcast and may transmit upon request the recorded video broadcast to the STB/DVR 150 for display on its display device 168. The video recording module 172 may poll the recording schedule 174 at predetermined time intervals or via other mechanisms may query the recording schedule 174 to determine whether there is a scheduled recording to record. Alternatively, notifications to the video recording module 172 to start and/or stop recording may be transmitted via system interrupts on the basis of the recording schedule 174. The update module 176 may glean from in-band EPG data associated with video programming being distributed by video broadcast/switch module 140 whether there is a scheduling update, and if so, may further update the recording schedule 174 in accordance with the update. The update module 176 may further receive periodic or scheduling updates from EPG/schedule process module 134, which obtains the updates from the local EPG database 132 based on notification from EPG update module 130. It is noted that the EPG/schedule process module 134 continues to transmit the periodic or scheduling updates to the STB/DVR 150. Upon receipt of a periodic update or a scheduling update, the update module 176 updates recording schedule 174 in accordance with the update. For a periodic update (e.g., every day), the update module 176 updates entries in the recording schedule 174 with those included in the periodic update. For a scheduling update, the update module 176 updates entries in recording schedule 174 that correspond to the scheduling update.

Further with reference to FIG. 9, the STD/DVR 150 of FIG. 9 is similar to the STB/DVR 150 of FIG. 1, except that the video recording and scheduling updates are performed at the video head end 128. More specifically, as noted above, the EPG/schedule process module 134 of VHE 128 continues to transmit the periodic or scheduling updates to the STB/DVR 150. The update module 178 receives these scheduling updates and updates its EPG 152 with the updates. The scheduling/playback module 180 displays the EPG 152 via the display module 164 on the display device 168 to a user and enables the user to select a particular video broadcast for recording or deselect a scheduled recording. The selection/deselection of the particular video broadcast is transmitted by the scheduling/payback module 180 to the update module 178, which in turn transmits the selection/deselection to the EPG/schedule process module 134 of the VHE 128. Upon receipt of the selection/deselection, the EPG/schedule process module 134 notifies the update module 176 of the remote DVR service 170, which updates the recording schedule 174 in accordance with the selection/deselection.

Still further with reference to FIG. 9, the scheduling/playback module 180 also enables the user to play a recorded video broadcast. More specifically, the scheduling/playback module 180 enables the user to select a recorded video broadcast for display using an appropriate display via the display module 164 and display device 168. Thus, upon selection of the recorded video broadcast, the scheduling/playback module 180 may use the tuning module 162 to tune to a channel for playing the recorded video broadcast. The tuning module 162 may request the video receiver 160 to request the video broadcast/switch module 140 to switch the video programming to the requested channel associated with the recorded video broadcast. Upon receipt of the request, the video broadcast/switch module 140 switches to the requested channel, signaling the video recording module 172 to transmit the recorded video broadcast via broadcast/switch module 140 to the STB/DVR 150 for display on display device 168.

Figure 10:
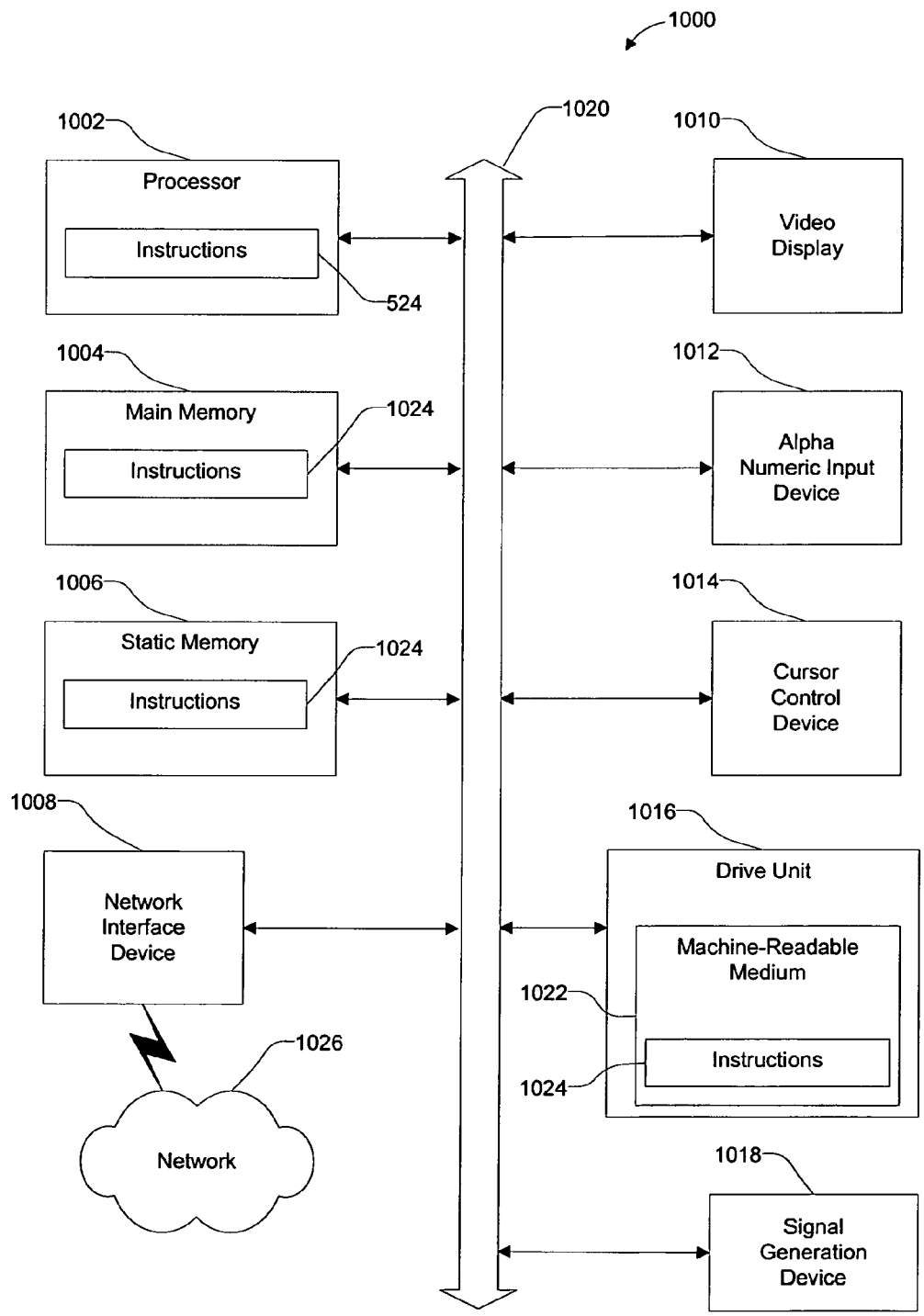
FIG. 10 is a diagrammatic representation of machine in an example form of a computer system within which a set of instructions, for causing the machine to perform any one or more of the methodologies described herein in FIGS. 1-9, may be executed.

FIG. 10 is a diagrammatic representation of machine in an example form of a computer system within which a set of instructions, for causing the machine to perform any one or more of the methodologies discussed herein in FIGS. 1-9, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 10, the example computer system 102 includes a processor 1002 (e.g., a central processing unit (CPU), a graphics processing unit (GPU) or both), a main memory 1004 and a static memory 1006, which communicate with each other via a bus 1020. The computer system 102 may further include a video display unit 1010 (e.g., a liquid crystal display (LCD) or a cathode ray tube (CRT)). The computer system 500 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1008.

Still further with reference to FIG. 10, the disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 504 and/or within the processor 1002 during execution thereof by the computer system 102, the main memory 1004 and the processor 1002 also constituting machine-readable media. The software 1024 may further be transmitted or received over a network 1026 via the network interface device 1008 utilizing any one of a number of well-known transfer protocols (e.g., HTTP).

Lastly with reference to FIG. 10, while the machine-readable medium 522 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method and system for recording a video broadcast using a video recording device in accordance with scheduling changes for a scheduled recording of the video broadcast have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A method comprising:
   receiving, by a system including a server, a transactional scheduling update for a broadcast from a media source provider;
   receiving, by the system, scheduling data associated with a group of media source providers that includes the media source provider;
   extracting, by the system, first in-band scheduling data from first media programming received by a first media reception server, wherein the first media programming is received from at least one of the group of media source providers;
   generating, by the system, first scheduling information based on the extracted first in-band scheduling data, the received scheduling data, and the transactional scheduling update;
   determining, by the system, a scheduling update based on the first scheduling information and second in-band scheduling data that is obtained from second media programming;
   updating, by the system, a recording schedule for the broadcast in response to the determined scheduling update;
   recording, by the system, the broadcast according to the updated recording schedule; and providing, by the system, the recording of the broadcast to a set-top box that is remote from the server of the system responsive to a request for the recording of the broadcast.

2. The method of claim 1, wherein the scheduling data associated with the group of media source providers is received by the system periodically based on a pre-determined time interval, and wherein the second media programming is received via a second media reception server.

3. The method of claim 1, wherein the scheduling data associated with the group of media source providers is received from an electronic programming guide aggregator in communication with the group of media source providers.

4. The method of claim 1, wherein the scheduling data associated with the group of media source providers is received by the system based on satisfying a threshold number of data updates.

5. The method of claim 1, comprising requesting, by the system, the transactional scheduling update at a predetermined time before a start time of the broadcast.

6. The method of claim 1, comprising requesting, by the system, the transactional scheduling update at a predetermined time before an end time of the broadcast.

7. The method of claim 1, wherein the system receives real-time scheduling data from each media source provider of the group of media source providers, and wherein the scheduling update is provided from the system to the set top box to enable the set top box to adjust a local programming guide stored at the set top box.

8. The method of claim 1, wherein the broadcast comprises a video broadcast, and wherein the system is located at a video head end of an internet protocol television system.

9. A non-transitory computer-readable storage medium comprising computer instructions which, responsive to being executed by a processor, cause the processor to perform operations comprising:
    obtaining a transactional scheduling update for a broadcast from a media source provider;
    obtaining scheduling data associated with a group of media source providers that includes the media source provider;
    obtaining first in-band scheduling data from first media programming received at a first media reception server, wherein the first media programming is received from at least one of the group of media source providers;
    generating first scheduling information based on the first in-band scheduling data, the scheduling data, and the transactional scheduling update;
    determining a scheduling update for the broadcast based on the first scheduling information and second in-band scheduling data that is obtained from second media programming received by a second media reception server;
    updating a recording schedule for the broadcast in response to the determined scheduling update; and
    recording the broadcast according to the updated recording schedule.

10. The non-transitory computer-readable storage medium of claim 9, comprising computer instructions which, responsive to being executed by the processor, cause the processor to perform operations comprising:
    providing the recording of the broadcast to a set-top box that is remote from the processor responsive to a request for the recording of the broadcast by the set top box.

11. The non-transitory computer-readable storage medium of claim 9, comprising computer instructions which, responsive to being executed by the processor, cause the processor to perform operations comprising:
    providing the scheduling update to a set top box that is remote from the processor to enable the set top box to adjust a local programming guide stored at the set top box.

12. The non-transitory computer-readable storage medium of claim 9, wherein the scheduling data associated with the group of media source providers is periodically received by the processor from an electronic programming guide aggregator based on a pre-determined time interval.

13. The non-transitory computer-readable storage medium of claim 9, wherein the scheduling data associated with the group of media source providers is received by the processor according to a threshold number of data updates.

14. The non-transitory computer-readable storage medium of claim 9, comprising computer instructions which, responsive to being executed by the processor, cause the processor to perform operations comprising: requesting the transactional scheduling update at a predetermined time before a start time of the broadcast.

15. The non-transitory computer-readable storage medium of claim 9, comprising computer instructions which, responsive to being executed by the processor, cause the processor to perform operations comprising: requesting the transactional scheduling update at a predetermined time before an end time of the broadcast.

16. The non-transitory computer-readable storage medium of claim 9, wherein the broadcast comprises a video broadcast, and wherein the video broadcast is over an internet protocol television system.

17. A system comprising:
    a guide distribution circuit that obtains a transactional scheduling update, scheduling data, and first in-band scheduling data, wherein the transactional scheduling update is for a broadcast from a media source provider, wherein the scheduling data is associated with a group of media source providers that includes the media source provider, wherein the first in-band scheduling data is generated from first media programming that is received from at least one of the group of media source providers, and wherein the guide distribution circuit generates first scheduling information based on the first in-band scheduling data, the scheduling data, and the transactional scheduling update;
    a scheduling circuit that stores a time schedule associated with recording of the broadcast, wherein the scheduling circuit accesses the first scheduling information, and wherein the scheduling circuit generates second in-band scheduling data from second media programming received by a media reception server;
    an updating circuit that determines a scheduling update for the broadcast based on the first scheduling information and the second in-band scheduling data;
    a recording circuit that records the broadcast according to the scheduling update; and
    a distribution circuit that provides the recorded broadcast to a set-top box.

18. The system of claim 17, wherein the distribution circuit provides the recorded broadcast to the set-top box responsive to a request for the recorded broadcast received from the set-top box.

19. The system of claim 17, wherein the first scheduling information is provided from the guide distribution circuit to the scheduling circuit responsive to satisfying a threshold based on a pre-determined number of updates received by a scheduling database.

20. The system of claim 17, wherein the scheduling update is provided from the distribution circuit to the set-top box to enable the set top box to adjust a local programming guide stored at the set-top box.

\* \* \* \* \*